United States Patent
Ai et al.

(10) Patent No.: US 10,979,929 B2
(45) Date of Patent: Apr. 13, 2021

(54) METHOD AND APPARATUS FOR TRANSMITTING AND RECEIVING SYSTEM INFORMATION, BASE STATION, AND TERMINAL

(71) Applicant: ZTE Corporation, Shenzhen, Guangdong (CN)

(72) Inventors: Jianxun Ai, Guangdong (CN); Bo Dai, Guangdong (CN); Xianming Chen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/189,979

(22) Filed: Nov. 13, 2018

(65) Prior Publication Data

US 2019/0208439 A1   Jul. 4, 2019

Related U.S. Application Data

(63) Continuation of application No. PCT/CN2017/084010, filed on May 11, 2017.

(30) Foreign Application Priority Data

May 13, 2016  (CN) .......................... 201610323477.2

(51) Int. Cl.
  *H04W 28/02*  (2009.01)
  *H04W 72/04*  (2009.01)
  *H04W 28/08*  (2009.01)

(52) U.S. Cl.
  CPC ... *H04W 28/0231* (2013.01); *H04W 28/0252* (2013.01); *H04W 28/08* (2013.01); *H04W 72/04* (2013.01)

(58) Field of Classification Search
  CPC ......... H04W 28/0231; H04W 28/0252; H04W 28/08; H04W 72/04
  See application file for complete search history.

(56) References Cited

U.S. PATENT DOCUMENTS

| | | | |
|---|---|---|---|
| 2015/0181575 A1 | 6/2015 | Ng et al. | |
| 2018/0270634 A1* | 9/2018 | Kim | ...................... H04W 48/00 |
| 2018/0310235 A1* | 10/2018 | You | .......................... H04W 8/00 |

FOREIGN PATENT DOCUMENTS

| | | |
|---|---|---|
| CN | 103428855 A | 4/2013 |
| CN | 103428855 A | 12/2013 |

(Continued)

OTHER PUBLICATIONS

EPO, Extended European Search Report for European Patent Application No. 17795595.2. dated Nov. 18, 2019. 11 pages.

(Continued)

*Primary Examiner* — Eric Myers
(74) *Attorney, Agent, or Firm* — Perkins Coie LLP

(57) ABSTRACT

The disclosed techniques provide a method and apparatus for transmitting and receiving system information, base station, and terminal. The method of transmitting system information comprises: configuring, by a base station, a radio frame for transmitting system information in a system information window with a system information repetition pattern; and, starting, by the base station, to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame. With this technical solution, the problem in related techniques that the system information cannot be (Continued)

transmitted using the prior art as the number of radio subframes that system information needs to occupy increases is solved, such that regardless of a size of the system information, a suitable number of radio subframes can be selected and thereby network resources are reasonably used.

12 Claims, 5 Drawing Sheets

(56) References Cited

FOREIGN PATENT DOCUMENTS

| CN | 104079392 A | 10/2014 |
|---|---|---|
| CN | 104796987 A | 7/2015 |
| EP | 2981015 A1 | 2/2016 |
| KR | 10-2016-0040418 A | 4/2016 |
| WO | 2014/180372 A1 | 11/2014 |
| WO | 2014180372 A1 | 11/2014 |
| WO | 2015/066645 A1 | 5/2015 |
| WO | 2015/106371 A1 | 7/2015 |
| WO | 2015106371 A1 | 7/2015 |

OTHER PUBLICATIONS

Ericsson, "Scheduling parameters for SIBs 1-12 other than SIB1-BR" 3GPP TSF-RAN WG2 #93. St. Julian's, Malta, Feb. 15-19, 2016. 6 pages.

ISA, International Search Report and Written Opinion for International Application No. PCT/CN2017-084010. dated Jul. 3, 2017. 14 pages with English translation.

JPO, Notice of Reasons for Rejection for Japanese Patent Application No. 2018-560028. dated Oct. 23, 2019. 5 pages with English translation.

JPO, Decision of Patent for Japanese Patent Application No. 2018-560028. dated Jul. 16, 2020. 4 pages with English translation.

Nokia Networks, "SIB transmission for NB-IoT" 3GPP TSG-RAN WG1 NB-IoT Adhoc. Budapest, Hungary, Jan. 18-20, 2016. 4 pages.

Chinese Office Action dated Sep. 17, 2020 for Chinese Patent Application No. 2016103234772 filed on May 13, 2016 (9 pages).

Chinese Search Report dated Sep. 7, 2020 for Chinese Patent Application No. 201610323477.2 filed on May 13, 2016 (6 pages).

Ericsson, "SI message scheduling for NB-IoT," 3GPP TSG-RAN WG2 Meeting NB-I0T ad-hoc, R2-163256, Sophia-Antipolis, France, May 2016 (6 pages).

Huawei et al, "System Information Scheduling and Update," 3GPP TSG-RAN WG2 Meeting #93 bis, R2-162325, Dubrovnik, Croatia, Apr. 2016 (5 pages).

Indian Office Action dated Nov. 20, 2020 for Indian Patent Application No. 201810747087, filed on May 11, 2017 (6 pages).

Korean Office Action dated Dec. 18, 2019 for Korean Patent Application No. 10-2018-7036274, filed on May 11, 2017 (10 pages).

Nokia Networks et al., "PBCH/MIB Enhancement for MTC," 3GPP TSG-RAN WG1 Meeting #80, R1-150262, Athens, Greece, Feb. 2015 (5 pages).

ZTE, "Discussion on system information scheduling," 3GPP TSG-RAN WG2 Meeting#94, R2-164118, Nanjing, China, May 2016 (4 pages).

EPO, Communication pursuant to Article 94(3) EPC for European Patent Application No. 17795595.2. dated Jan. 11, 2021. 6 pages.

Korean Notice of Allowance dated Dec. 29, 2020 for Korean Patent Application No. 10-2018-7036274, filed on May 11, 2017 (6 pages).

* cited by examiner

METHOD AND APPARATUS FOR TRANSMITTING AND RECEIVING SYSTEM INFORMATION, BASE STATION, AND TERMINAL

CROSS REFERENCE TO RELATED APPLICATIONS

This patent application is a continuation of and claims priority to International Patent Application No. PCT/CN2017/084010, filed on May 11, 2017, which claims the benefit of priority of Chinese Patent Application No. 201610323477.2, filed on May 13, 2016. The entire contents of the before-mentioned patent applications are incorporated by reference as part of the disclosure of this application.

FIELD OF THE TECHNOLOGY

The disclosed techniques relate to the field of communication and, more particularly, to a method and apparatus for transmitting and receiving system information, a base station, and a terminal.

BACKGROUND OF THE DISCLOSURE

Machine to Machine (M2M) communication is an important issue in the study of $5^{th}$ Generation (5G) Mobile Communication Technology, and it is also an important application area for future wireless communication. In the M2M project, the $3^{rd}$ Generation Partnership Project (3GPP) proposes a research subproject of a Narrow Band Internet of Things (NB-IoT) system for characteristics of low-cost, low-throughput terminals, for the purpose of building a system similar to the Long-Term Evolution (LTE) in the frequency band of 200 KHz so as to provide a low-throughput wireless communication service for the low-cost terminals.

System information (SI) is common information of a cell and is used to indicate a system parameter of the cell. User equipment (UE) resides in the cell and must maintain consistency of the latest system information. System information is typically carried over a broadcast channel of the cell to be transmitted. In LTE and NB-IoT systems, system information is divided into two categories, a master information block (MIB) and a system information block (SIB). The SIB is subdivided into differently numbered system information blocks, e.g. SIB1, SIB2 and SIB3. Except SIB1, the other system information blocks form one or more pieces of SI. SIB1 carries scheduling information of the compositive SI. The scheduling information is used to indicate the numbers and transmission periods of system information blocks included in each SI, and a time window in which UE receives these pieces of SI.

Each SI has its transmission period. A system configures a send window, called a SI-window (also known as a system information window), for each SI in the time interval of the transmission period of the SI. SI is scheduled to be sent in this window. As shown in FIG. 1, SI-windows of a plurality of pieces of SI are arranged in turn in a configured order for sending. Transmission periodicity is configured for SI-1 and SI-2, respectively. A period of SI-2 is twice a period of SI-1. In a transmission period of SI, if periods of both SI-1 and SI-2 are met, SI-widows of SI-1 and SI-2 are arranged in turn in the time interval of the period.

In the 3GPP conclusion, SI is transmitted in an SI-window according to the following method: the system configures a radio frame (RadioFrame) for repeated transmission of each SI in the SI-window for the SI, specifies with an SI repetition pattern that the SI uses sub-frame resources of the $M^{th}$ radio frame of every N radio frames in its SI-window, specifies an available wireless sub-frame of the radio frame by configuring a downlink valid sub frame, and defines that a radio subframe in the radio frame occupied by specific system control information is an invalid subframe. Such specific system control information includes a Physical Broadcast Channel (PBCH), Primary Synchronization Symbol (PSS), Secondary Synchronization Symbol (SSS) and SI block type one (SIB1).

Thus, available radio subframes used to transmit SI mean: radio subframes except a radio subframe occupied by the specific system control information, and an invalid radio subframe.

Thus, FIG. 2 shows a schematic diagram illustrating radio subframe resources configured for one piece of SI in the above method. The $m^{th}$ radio frame of every N radio frames in the SI-window of the SI is configured to be the radio frame to transmit the SI. FIG. 3 illustrates an example of valid radio subframes in one radio frame that can be sued to transmit SI.

On the other hand, in the technical solution of the NB-IoT or enhanced MTC (eMTC), some UE is in a weak coverage area of the radio signal. For this demand, a network side transmits the same information repeatedly, and the UE merges it after receiving the information, so as to enhance quality of received signals. Therefore, a base station transmits the SI repeatedly in the above radio subframes available to the SI during transmission of the SI so as to enhance quality of SI received by UE.

One piece of SI needs to occupy only one radio subframe in the eMTC. Thus, each radio subframe in the above radio subframe resources configured by the base station transmits the SI once repeatedly. While in the NB-IoT, depending on a different size of SI, one piece of SI may need 8, 4, or 2 radio subframes to complete one transmission.

The number of radio subframes required for transmission of SI information in the NB-IoT is greater than 1, which brings the following problem: there may not be enough available radio subframes for one complete transmission of SI in a radio frame for transmission of the SI configured in the above method, or the available radio subframes are greater than resources required for one complete transmission of the SI, but are not an integer multiple of the resources required for one complete transmission of the SI.

Accordingly, there has not been an effective solution to the problem of transmitting SI using an increased amount of radio subframes.

SUMMARY OF THE DISCLOSURE

The embodiments of the disclosed techniques provide a method and apparatus for transmitting and receiving system information, a base station, and a terminal, so as to at least solve the problem in related techniques that the SI can not be transmitted using the prior art as the number of radio subframes that SI needs to occupy increases.

According to an embodiment of the disclosed techniques, a method of transmitting system information is provided to include:

configuring, by a base station, a radio frame for transmitting the system information in a system information window with a system information repetition pattern; starting, by the base station, to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame.

According to another embodiment of the disclosed techniques, a method of receiving system information is also provided to include:

starting, by a terminal, to receive the system information in an available radio subframe of a radio frame indicated by a system information repetition pattern, wherein if there are not enough available radio subframes for receiving the system information one or more times in the radio frame indicated by the system information repetition pattern, the system information is repeatedly received one or more times in an available radio subframe in a specified radio frame.

According to another embodiment of the disclosed techniques, an apparatus for transmitting system information for use in a base station is also provided to include: a configuration module configured to configure a radio frame for transmitting the system information in a system information window with a system information repetition pattern; a transmission module configured to start to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame.

According to another embodiment of the disclosed techniques, an apparatus for receiving system information for use in a terminal is also provided to include: a receiving module configured to receive the system information in an available radio subframe of a radio frame indicated by a system information repetition pattern, wherein if there are not enough available radio subframes for receiving the system information one or more times in the radio frame indicated by the system information repetition pattern, the system information is repeatedly received one or more times in an available radio subframe in a specified radio frame.

According to another embodiment of the disclosed techniques, a base station is provided to include:

a configuration module configured to configure a radio frame for transmitting the system information in a system information window with a system information repetition pattern; a transmission module configured to start to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame.

According to another embodiment of the disclosed techniques, a terminal is provided to include:

a receiving module configured to receive the system information in an available radio subframe of a radio frame indicated by a system information repetition pattern, wherein if there are not enough available radio subframes for receiving the system information one or more times in the radio frame indicated by the system information repetition pattern, the system information is repeatedly received one or more times in an available radio subframe in a specified radio frame.

According to another embodiment of the disclosed techniques, a storage medium is also provided to include a stored program that, when running, executes the above method of transmitting system information, or the above method of receiving system information.

Based on the embodiments of the disclosed techniques, if there are not enough available radio subframes for transmitting system information one or more times in a radio frame configured by a system with a system information repetition pattern, an available radio subframe required for transmitting the system information is selected in a specified radio frame so as to continue to transmit the system information. Thus, the problem in related other techniques that the system information cannot be transmitted as the number of radio subframes that system information needs to occupy increases is solved, such that regardless of a size of the system information, a suitable number of radio subframes can be selected and thereby network resources are reasonably used.

BRIEF DESCRIPTION OF THE DRAWINGS

The drawings described herein are intended to provide a further understanding of the disclosed technologies and constitute a part of the application, and the illustrative embodiments of the disclosed techniques and their descriptions are intended to explain the disclosed techniques and are not to be construed as limiting a claimed invention. In the drawings:

EXAMPLE EMBODIMENTS

The disclosed techniques will be described hereinafter in detail with reference to the drawings and embodiments. It is to be noted that embodiments in the present application and features in embodiments may be combined with each other if no conflict is present.

It is to be noted that the terms in the description, claims and drawings for the disclosed techniques, "first," "second,"

etc., are used to distinguish similar objects and are not necessary for describing a particular order or succession.

A method embodiment provided in embodiment 1 of the present application may be executed in a base station, a computer terminal, or a similar computing device. Taking running on a base station as the example, the base station may include one or more processors (which may include, but are not limited to, a processing device such as a microprocessor (MCU) or a programmable logic device (FPGA)), a memory for storing data, and a transmission device for a communication function. It will be understood by those of ordinary skill in the art that the foregoing description is merely illustrative and does not limit the structure of the base station described above.

The memory can be used to store a software program and module of application software, such as program instructions/modules corresponding to a method of transmitting system information in an embodiment of the disclosed techniques. The processor executes application of various functions and data processing, i.e., implements the above method, by running the software program and module stored in the memory. The memory may include a high speed random access memory, or a nonvolatile memory, such as one or more magnetic storage devices, flash memory, or other nonvolatile solid state memory.

Embodiment 1

Figure 1:
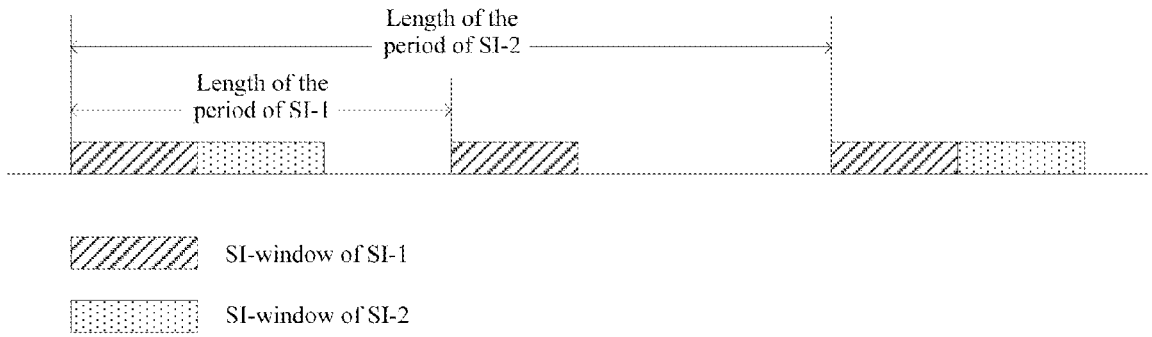
FIG. 1 is a schematic diagram of an SI-window technique for system information in a related technique.
Figure 2:
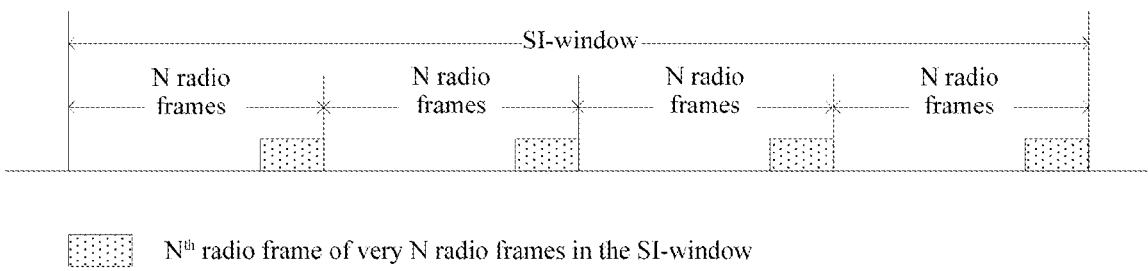
FIG. 2 is a schematic diagram of a radio frame resource indicated by a system information repetition pattern in the NB-IoT technique.
Figure 3:
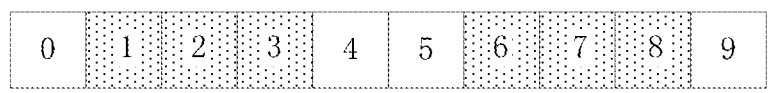
FIG. 3 is a schematic diagram of valid radio subframes in one radio frame in the NB-IoT technique.
Figure 3:
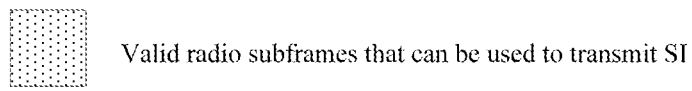
Figure 4:
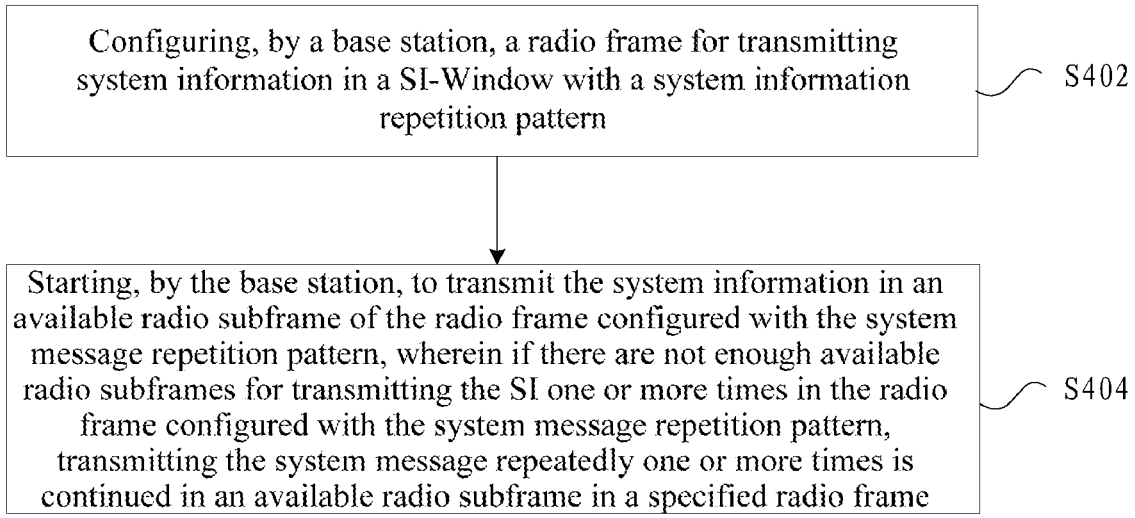
FIG. 4 is a flow chart of a method of transmitting system information according to an embodiment of the disclosed techniques.

A method for transmitting system information is provided in the embodiment. FIG. 4 is a flow chart of a method of transmitting system information according to an embodiment of the disclosed techniques. As shown in FIG. 4, the process comprises the following steps:

step S402, in which a base station configures a radio frame for transmitting the system information in a system information window with a system information repetition pattern;

step S404, in which the base station starts to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame.

With the above steps, if there are not enough available radio subframes for transmitting system information one or more times in a radio frame configured by a system with a system information repetition pattern, an available radio subframe required for transmitting the system information is selected in a specified radio frame so as to continue to transmit the system information. Thus, the problem in related techniques that the system information cannot be transmitted using the prior art as the number of radio subframes that system information needs to occupy increases is solved, such that regardless of a size of the system information, a suitable number of radio subframes can be selected and thereby network resources are reasonably used.

That is, by starting from a radio frame indicated by the system information repetition pattern to a specified radio frame, available radio subframes in these radio frames are continuously used until one or more complete repeated transmissions of the system information are completed.

In an example for implementing the disclosed techniques, when in a radio frame indicated by a system information repetition pattern there are not enough available radio subframes for transmitting the system information one or more times, the system information is transmitted in the following way: the system information is repeatedly transmitted in available radio subframes in a specified radio frame one or more times. For example, the system information may be repeatedly transmitted in 10 available radio subframes in the specified radio frame 10 times.

"if there are not enough available radio subframes for transmitting system information one or more times in a radio frame configured by a system with a system information repetition pattern, an available radio subframe required for transmitting the system information is selected in a specified radio frame so as to continue to transmit the system information" in step 404 can be understood as that if the system information cannot be transmitted in the radio frame in which the transmission is started an integer number of times, that is, there is a case where the system information is not transmitted completely, a radio subframe still required for transmitting the system information is selected from the specified radio frame so as to transmit the system information. For example, the system information needs to be transmitted with A radio subframes, and B available radio subframes for transmitting the system information are included in the radio frame in which the transmission is started. If A is greater than B, the number of a difference between A and B of available radio subframes are selected in the specified radio frame to transmit the system information.

The specified radio frame at least comprises one of: a subsequent radio frame of the radio frame indicated by the system information repetition pattern; and, a next radio frame indicated by the system information repetition pattern.

In some embodiments, the specified radio frame can be understood as the $M^{th}$ radio frame in the next group of N radio frames of the group where the $M^{th}$ radio frame being currently transmitting the system information is, or a subsequent radio frame of the $M^{th}$ radio frame being currently transmitting the system information, i.e., the $M+1^{th}$ radio frame, the $M+2^{th}$ radio frame, and so on, until one or more transmissions of the system information is completed, where M is greater than or equal to 1 and less than or equal to N.

It is to be noted that if the specified radio frame is the $M^{th}$ radio frame in the next group of N radio frames of the group where the $M^{th}$ radio frame being currently transmitting the system information is, the available radio subframes of the last group of radio frames, which are not enough to perform one complete transmission of the system information, are prohibited from transmitting the system information if the number of available radio subframes of the last group of radio frames cannot perform one complete transmission of the system information.

The method also comprises: determining the number of times the system information is to be repeatedly transmitted from each radio frame indicated by the system information repetition pattern based on a size of the system information to be transmitted, and indicating to the terminal the number of times the system information is to be repeatedly transmitted from each radio frame indicated by the system information repetition pattern in at least one of the following ways: specifying a protocol agreement; and, specifying a signaling notification.

In an embodiment of the disclosed techniques, the number of repetitions of transmission of system information from each radio frame indicated by the repetition pattern or from every N radio frames is agreed by a protocol, or is indicated to the terminal through signaling. The method of agreement by a protocol comprises:

the protocol agrees a mapping relationship between a Transport Block Size (TBS) of information and the number of repetitions.

The protocol agrees a mapping relationship between a size of information and the number of radio subframes required for one repetition of transmission, and agrees a mapping relationship between the number of radio subframes required for one repetition of transmission and the number of repetitions.

Embodiment 2

Figure 5:
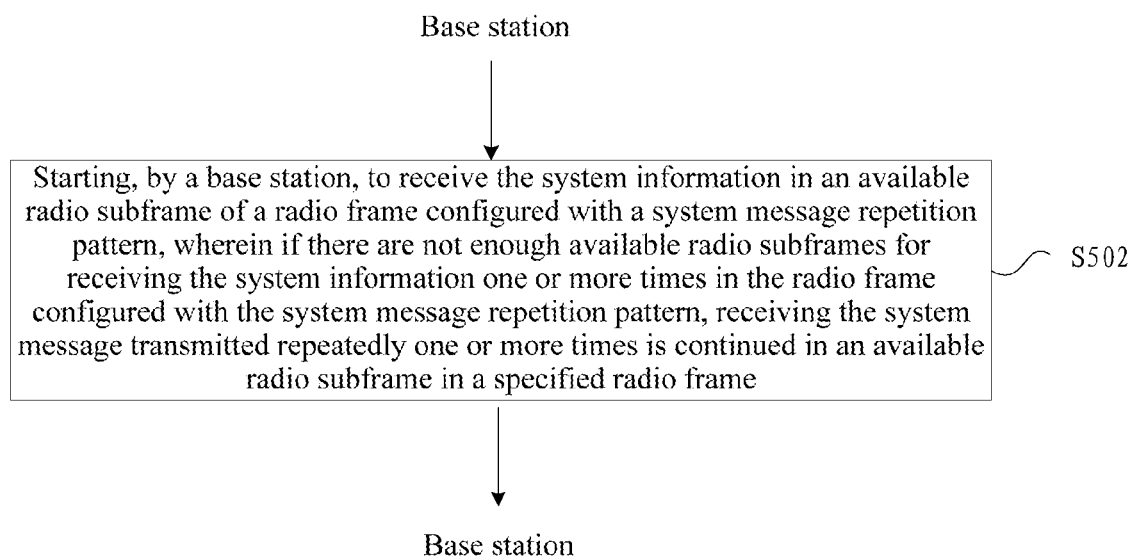
FIG. 5 is a flow chart of a method of receiving system information according to an embodiment of the disclosed techniques.

A method for receiving system information is provided in the embodiment. FIG. 5 is a flow chart of a method of receiving system information according to the embodiment of the disclosed techniques. As shown in FIG. 5, the process comprises the following steps:

step S502, in which a terminal starts to receive the system information in an available radio subframe of a radio frame indicated by a system information repetition pattern, wherein if there are not enough available radio subframes for receiving the system information one or more times in the radio frame indicated by the system information repetition pattern, the system information is repeatedly received one or more times in an available radio subframe in a specified radio frame.

With the above steps, if there are not enough available radio subframes for transmitting system information one or more times in a radio frame configured by a system with a system information repetition pattern, an available radio subframe required for transmitting the system information is selected in a specified radio frame so as to continue to transmit the system information. Thus, the problem in related techniques that the system information cannot be transmitted using the prior art as the number of radio subframes that system information needs to occupy increases is solved, such that regardless of a size of the system information, a suitable number of radio subframes can be selected and thereby network resources are reasonably used.

The specified radio frame at least comprises one of: a subsequent radio frame of the radio frame indicated by the system information repetition pattern; and, a next radio frame indicated by the system information repetition pattern.

The specified radio frame can also be understood as: the $M^{th}$ radio frame in the next group of N radio frames of the group where the $M^{th}$ radio frame being currently transmitting the system information is, or a subsequent radio frame of the $M^{th}$ radio frame being currently transmitting the system information, i.e., the $M+1^{th}$ radio frame, the $M+2^{th}$ radio frame, and so on, until one or more transmissions of the system information is completed.

It is to be noted that how the system information repetition pattern configures a radio frame where to start to transmit system information is limited when implementing the disclosed techniques. Thus, the disclosed techniques are applicable to different methods of a system information repetition mode configuring a radio frame to transmit system information.

In one embodiment for implementing the disclosed techniques, radio frames in an SI-window is divided into N groups, and the $M^{th}$ radio frame of each group is the radio frame to transmit system information.

An embodiment of the disclosed techniques also applies to other method of configuring a system information repetition pattern, e.g., the following method: a base station specifies a radio frame as the radio frame to transmit system information from the $L^{th}$ radio frame every N radio frames.

It will be apparent to those skilled in the art from the description of the above embodiments that the method according to the above embodiments can be realized by means of software plus a necessary general hardware platform, or of course by means of hardware. But in many cases the former is better implementation. Based on such understanding, the substantial part or the part making contribution over the prior art of the disclosed techniques may be embodied in the form of a software product that is stored on a storage medium (such as a ROM/RAM, disk, and optical disc) including a number of instructions for causing a terminal device (which may be a mobile phone, a computer, a server, a network device, or the like) to execute the methods of the various embodiments of the disclosed techniques.

Embodiment 3

An apparatus for transmitting system information for use in a base station is provided in the embodiment. The apparatus is used to carry out the above embodiments and preferred embodiments, and a description that has been made will not be repeated. As used hereinafter, the term "module" may implement a combination of software and/or hardware of a predetermined function. Although the apparatus described in the following embodiment is preferably implemented by software, implementation by hardware or a combination of software and hardware is also possible and conceived.

Figure 6:
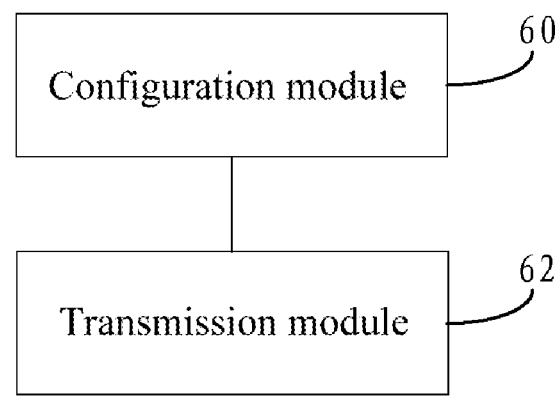
FIG. 6 is a structural block diagram of an apparatus for transmitting system information according to an embodiment of the disclosed techniques.

FIG. 6 is a structural block diagram of the apparatus for transmitting system information according to the embodiment of the disclosed techniques. As shown in FIG. 6, the apparatus comprises:

a configuration module 60 configured to configure a radio frame for transmitting the system information in a system information window with a system information repetition pattern;

a transmitting module 62 configured to start to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame.

Through a combined effect of the above various modules, if there are not enough available radio subframes for transmitting one or more pieces of system information in a radio frame indicated by a system information repetition pattern, an available radio subframe required for transmitting the system information is selected in a specified radio frame so as to continue to transmit the system information. Thus, the problem in related techniques that the system information cannot be transmitted using the prior art as the number of radio subframes that system information needs to occupy increases is solved, such that regardless of a size of the system information, a suitable number of radio subframes can be selected and thereby network resources are reasonably used.

The specified radio frame at least comprises one of: a next radio frame indicated by the system information repetition pattern; and, a subsequent radio frame of the radio frame being currently transmitting the system information. That is, if the radio frame being currently transmitting the system information is the $M^{th}$ radio frame, the subsequent radio frame is the $M+1^{th}$ radio frame, the $M+2^{th}$ radio frame, and so on, until one or more repetitions of transmission of the system information are completed.

It is to be noted that the available radio subframes of the last group that cannot transmit complete system information are prohibited from transmitting the system information, if the number of available radio subframes of a last one of a plurality of groups containing N radio frames radio frame cannot transmit complete system information.

Embodiment 4

An apparatus for receiving system information for use in a terminal is provided in the embodiment. The apparatus is used to carry out the above embodiments and preferred embodiments, and a description that has been made will not be repeated. As used hereinafter, the term "module" may implement a combination of software and/or hardware of a predetermined function. Although the apparatus described in the following embodiment is preferably implemented by software, implementation by hardware or a combination of software and hardware is also possible and conceived.

Figure 7:
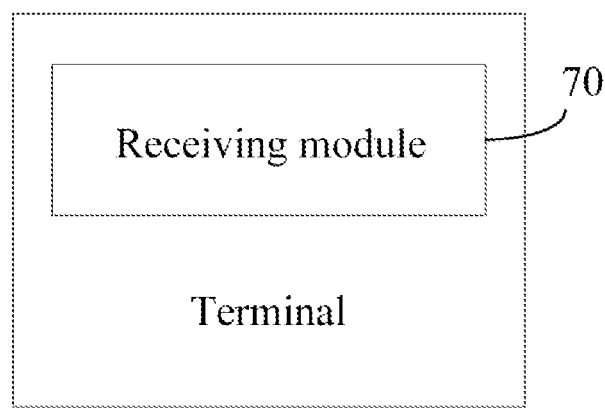
FIG. 7 is a structural block diagram of an apparatus for receiving system information according to an embodiment of the disclosed techniques.

FIG. 7 is a structural block diagram of the apparatus for receiving system information according to the embodiment of the disclosed techniques. As shown in FIG. 7, the apparatus comprises:

a receiving module 70 configured to receive the system information in an available radio subframe of a radio frame indicated by a system information repetition pattern, wherein if there are not enough available radio subframes for receiving the system information one or more times in the radio frame indicated by the system information repetition pattern, the system information is repeatedly received one or more times in an available radio subframe in a specified radio frame.

As the function of the above module, the receiving module 70 receives system information transmitted by a base station. If there are not enough available radio subframes for receiving one or more pieces of system information in a radio frame indicated by a system information repetition pattern, the receiving module 70 selects available radio subframes required for receiving the system information in a specified radio frame so as to continue to receive one or more repetitions of the system information. Thus, the problem in related techniques that the system information cannot be transmitted using the prior art as the number of radio subframes that system information needs to occupy increases is solved, such that regardless of a size of the system information, a suitable number of radio subframes can be selected and thereby network resources are reasonably used.

Embodiment 5

According to another embodiment of the disclosed techniques, provided is also a base station, comprising:

a configuration module configured to configure a radio frame for transmitting the system information in a system information window with a system information repetition pattern; a transmitting module configured to start to transmit the system information in an available radio subframe of the radio frame indicated by the system information repetition pattern, wherein if there are not enough available radio subframes for transmitting the SI one or more times in the radio frame indicated by the system information repetition pattern, the system information is repeatedly transmitted one or more times in an available radio subframe in a specified radio frame.

Embodiment 6

According to another embodiment of the disclosed techniques, provided is also a terminal, comprising:

a receiving module configured to receive the system information in an available radio subframe of a radio frame indicated by a system information repetition pattern, wherein if there are not enough available radio subframes for receiving the system information one or more times in the radio frame indicated by the system information repetition pattern, the system information is repeatedly received one or more times in an available radio subframe in a specified radio frame.

It is to be noted that each of the modules may be implemented by software or hardware. For the latter, the way for the implementation may be, but is not limited to: all of the modules are located in the same processor; or, the modules are located in different processors in a form of any combinations of the modules, respectively.

The technical solutions of the above embodiments are described in detail below with reference to preferred embodiments.

Preferred Embodiment 1

Figure 8:
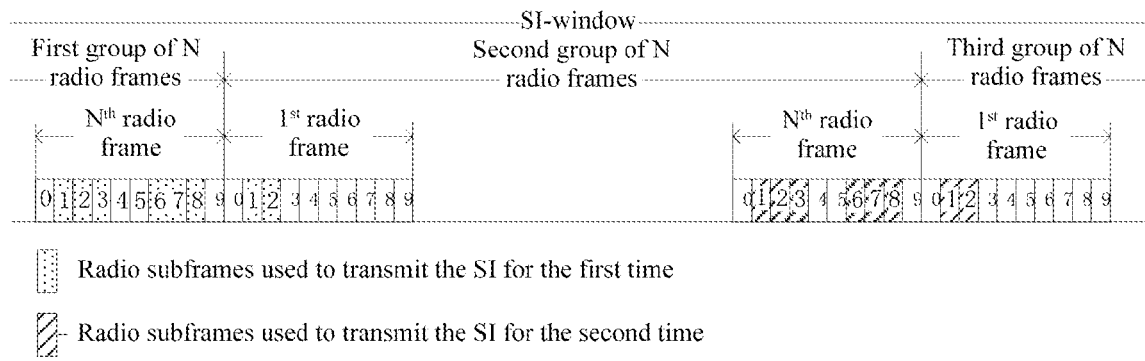
FIG. 8 is a schematic diagram of a transmission of system information according to preferred embodiment 1 of the disclosed techniques.

FIG. 8 is a schematic diagram of a transmission of system information according to preferred embodiment 1 of the disclosed techniques. As shown in FIG. 8:

the main inventive concept of preferred embodiment 1 of the disclosed techniques is that a base station starts to transmit system information (SI) in an available radio subframe of a radio frame, wherein the radio frame is indicated by a system information repetition pattern for transmitting SI, and if there are not enough available radio subframes to transmit the SI one or more times in one configured radio frame to transmit SI, the base station transmits one or more repetitions of the SI in available radio subframes in the radio frame for transmitting SI and a subsequent radio frame (corresponding to the specified radio frame in the above embodiments).

As shown in FIG. 8, a radio frame for transmitting SI indicated by the repetition pattern is an $N^{th}$ one of every N radio frames. Accordingly, in a system information window of the SI, every N radio frames are grouped, and a $N^{th}$ one of each group of N radio frames is the radio frame to transmit SI indicated by the repetition pattern. A $N^{th}$ radio frame in each group has 6 valid radio subframes that can be used to transmit SI. Depending on its size, SI needs to take 8, 4, or 2 radio subframes to complete its one transmission.

For a case where 8 radio subframes need to be taken to complete one transmission of SI, the base station uses 8 continuous radio subframes in a $N^{th}$ one of each group of N radio frames and the subsequent radio frame to complete one complete transmission of the SI. In a preferred embodiment of the disclosed techniques, valid radio subframes in each radio frame are subframes numbered 1, 2, 3, 6, 7, and 8. Therefore, radio subframes 1, 2, 3, 6, 7, and 8 in the $N^{th}$ radio frame are used and radio subframes 1 and 2 in the subsequent radio frame of the $N^{th}$ radio frame are used. 8 continuous valid radio subframes in total are used.

It is to be noted that, in the preferred embodiment of the disclosed techniques, the SI is transmitted completely only once in the transmission of the SI that is started at each radio frame to transmit SI configured with the repetition pattern That is, every N radio frames transmit the SI only once.

For a case where 4 or 2 radio subframes need to be taken to complete one transmission of SI, there are the following two options.

Option I: the base station transmits the SI only once in a radio frame to transmit SI indicated by the repetition pattern. If there are not enough valid radio subframes to transmit the SI completely once in the configured radio frame to transmit SI, the base station uses valid radio subframes in the radio frame and a subsequent radio frame to complete the transmission of the SI.

Option II: the SI is transmitted repeatedly several times from a radio frame to transmit SI indicated by the repetition pattern. That is, the SI is transmitted repeatedly several times in every N radio frames. The number of repetitions is associated with a size of the SI. For example, supposing that a size of the SI is 2, that is, 2 valid radio subframes are required to complete one transmission, the times the SI is transmitted repeatedly in every N radio frames is M1 and a value of M1 may be 4. While supposing that a size of the SI is 4, that is, 4 valid radio subframes are required to complete one transmission, the times the SI is transmitted repeatedly in every N radio frames is M2 and a value of M2 may be 2.

After determining the times the SI is transmitted repeatedly in every N radio frames, a method of an embodiment of the disclosed techniques is followed to determine valid radio subframes to be used to transmit the SI. That is, the base station transmits the SI one or more times in available radio subframes in the radio frame to transmit SI and a subsequent radio frame if there are not enough available radio subframes to transmit the SI one or more times in one configured radio frame to transmit SI.

Preferred Embodiment 2

Figure 9:
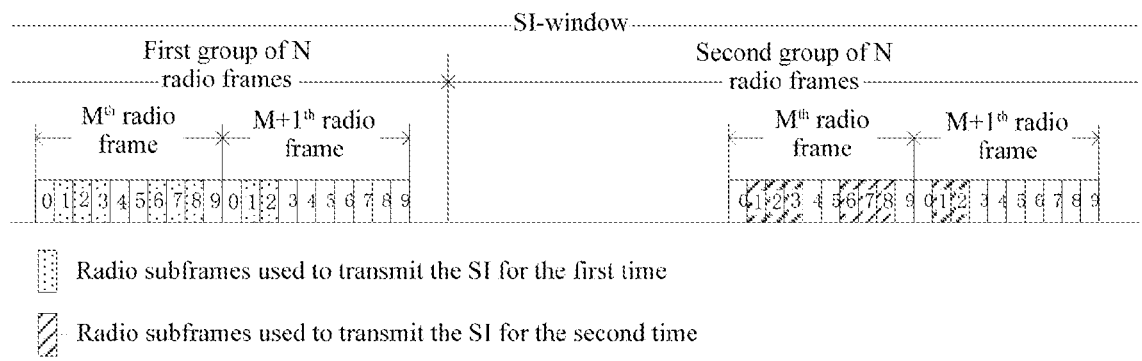
FIG. 9 is a schematic diagram of a transmission of system information according to preferred embodiment 2 of the disclosed techniques.

FIG. 9 is a schematic diagram of a transmission of system information according to preferred embodiment 2 of the disclosed techniques. As shown in FIG. 9, preferred embodiment 2 differs from preferred embodiment 1 only in the location of a radio frame to transmit SI indicated by the repetition pattern. In preferred embodiment 2 of the disclosed techniques, every N radio frames are grouped and an $M^{th}$ radio frame in each group of N radio frames is configured as a starting radio frame to transmit SI.

Preferred Embodiment 3

Figure 10:
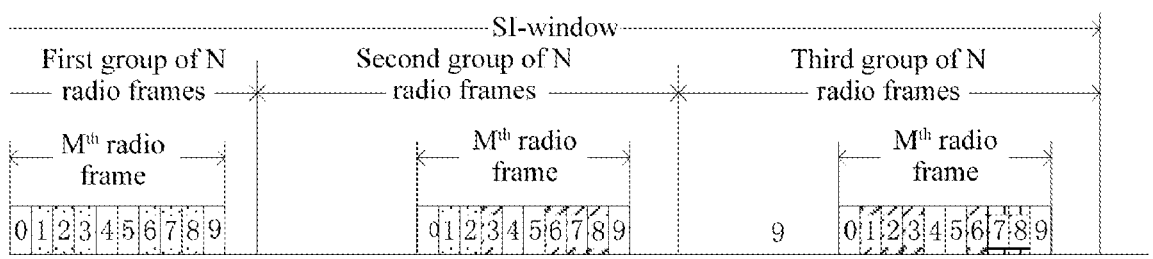
FIG. 10 is a schematic diagram of a transmission of system information according to preferred embodiment 3 of the disclosed techniques.

FIG. 10 is a schematic diagram of a transmission of system information according to preferred embodiment 3 of the disclosed techniques. As shown in FIG. 10, the technical solution of the preferred embodiment of the disclosed techniques can be understood as: a base station continuously transmits SI in valid radio subframes of a radio frame to transmit SI indicated by a repetition pattern.

In preferred embodiment 3 of the disclosed techniques, every N radio frames are grouped and a $M^{th}$ radio frame of each group is a radio frame to transmit SI. One complete transmission of the SI requires S radio subframes. Accordingly, the base station continuously uses valid radio subframes of radio frames to transmit SI of the SI configured in an SI-window of the SI from the first radio frame to transmit SI in the SI-window, wherein every S radio subframes are used to completely transmit SI once.

As shown in FIG. 10, 6 valid subframes in an $M^{th}$ radio frame of the first group of N radio frames and 2 valid subframes in an $M^{th}$ radio frame of the second group of N radio frames are used for a first transmission of the SI. 4 valid subframes in the $M^{th}$ radio frame of the second group of N radio frames and 4 valid subframes in an $M^{th}$ radio frame of the third group of N radio frames are used for a second transmission of the SI, and so on.

The number of valid radio subframes in all radio frames configured to transmit SI in the SI-window of the SI is Q. When Q is not an integer multiple of the number S of radio subframes required to transmit the SI once, a radio subframe not enough to completely transmit the SI once is not used to transmit the SI. As in this example, the last 2 radio subframes of the $M^{th}$ radio frame of the third group of N radio frames are not enough to completely transmit the SI (S=8) once, these 2 radio subframes are not used to transmit the SI.

To sum up, embodiments of the disclosed techniques achieve the following technical effect of solving the problem in related techniques that the system information cannot be transmitted using the prior art as the number of radio subframes that system information needs to occupy increases, such that regardless of a size of the system information, a suitable number of radio subframes can be selected and thereby network resources are reasonably used.

Embodiment 7

An embodiment of the disclosed techniques also provides a storage medium. This storage medium may be configured to store program code for executing the following steps:

s1, in which a radio frame for transmitting system information is configured in a system information window with a system information repetition pattern; and, s2, in which transmitting the system information is started in an available radio subframe of the radio frame indicated by the system information repetition pattern, wherein if there are not enough available radio subframes for transmitting the SI one or more times in the radio frame indicated by the system information repetition pattern, transmitting the system information repeatedly one or more times is continued in an available radio subframe in a specified radio frame.

An embodiment of the disclosed techniques also provides a storage medium. The storage medium may be configured to store program code for executing the following steps:

S1, in which receiving the system information is started in an available radio subframe of a radio frame indicated by a system information repetition pattern, wherein if there are not enough available radio subframes for receiving the system information one or more times in the radio frame indicated by the system information repetition pattern, receiving the system information transmitted repeatedly one or more times is continued in an available radio subframe in a specified radio frame.

Alternatively, in the embodiment, the storage medium may include, but is not limited to, a variety of media that can store program code, such as a USB disk, a Read-Only Memory (ROM), a Random Access Memory (RAM), a mobile hard disk, a magnetic disk, and a CD. Alternatively, specific examples in the present embodiment may refer to the examples described in the above embodiments and alternative embodiments, and will not be described here in the embodiment.

It will be apparent to those skilled in the art that the above various modules or steps of the disclosed techniques may be implemented by a general purpose computing device and can be concentrated in a single computing device or distributed over a network composed of a plurality of computing devices. Alternatively, they may be implemented with program code executable by a computing device, so that they may be stored in a storage device to be executed by the computing device and, in some cases, they may be implemented by executing the steps shown or described in an order different from that described herein, or by separately making them into individual integrated circuit modules, or by making a plurality of modules or steps of them into a single integrated circuit module. Thus, an implementation of the disclosed techniques is not limited to any particular combination of hardware and software.

The foregoing is only preferred embodiments of the disclosed techniques and is not for use in limiting the protection scope thereof, and for those skilled in the art, there may be various modifications and changes to the disclosed techniques. Any modification, equivalent substitution, and improvement without departing from the spirit and principle of a claimed invention should be covered in the protection scope of the claimed invention.

INDUSTRIAL APPLICABILITY

The technical solutions provided by the embodiments of the disclosed techniques are applicable to the transmission of system information. If there are not enough available radio subframes for transmitting system information one or more times in a radio frame configured by a system with a system information repetition pattern, an available radio subframe required for transmitting the system information is selected in a specified radio frame so as to continue to transmit the system information. Thus, the problem in related techniques that the system information cannot be transmitted using the prior art as the number of radio subframes that system information needs to occupy increases is solved, such that regardless of a size of the system information, a suitable number of radio subframes can be selected and thereby network resources are reasonably used.

The invention claimed is:

1. A method of transmitting system information, comprising:
   transmitting, by the base station, a first part of a system information in a system information window to a terminal, wherein the first part of the system information is carried in one or more radio subframes of a first radio frame in the system information window, the first radio frame indicated by a system information repetition pattern and the one or more radio subframes being valid for carrying a transmission from the base station to the terminal, the system information repetition pattern specifying that the system information is transmitted in $M^{th}$ radio frame of every N radio frames, M being greater than or equal to 1 and less than or equal to N,
   transmitting, by the base station upon determining that there are not enough radio subframes for transmitting the system information in the first radio frame, a second part of the system information in at least a second radio frame in the system information window subsequent to the first radio frame in time domain.

2. The method of claim 1, wherein the second radio frame is next to the first radio frame in time domain.

3. A method of receiving system information, comprising:
   receiving, by a terminal, a first part of system information in a system information window from a base station, wherein the first part of the system information is carried in one or more radio subframes of a first radio frame in the system information window, the first radio frame indicated by a system information repetition pattern and the one or more radio subframes being valid for carrying a transmission from the base station to the terminal, the system information repetition pattern specifying that the system information is transmitted in $M^{th}$ radio frame of every N radio frames, M being greater than or equal to 1 and less than or equal to N,
   receiving, by the terminal upon a determination that there are not enough radio subframes for the system information in the first radio frame, a second part of the system information in at least a second radio frame in the system information window subsequent to the first radio frame in time domain.

4. The method of claim 3, wherein the second radio frame is next to the first radio frame in time domain.

5. An apparatus for transmitting system information, comprising:
   a transmitter configured to start to transmit a first part of a system information in a system information window to a terminal, wherein the first part of the system information is carried in one or more radio subframes of a first radio frame in the system information window, the first radio frame indicated by a system information repetition pattern and the one or more radio subframes being valid for carrying a transmission from the apparatus to the terminal, the system information repetition pattern specifying that the system information is transmitted in $M^{th}$ radio frame of every N radio frames, M being greater than or equal to 1 and less than N,
   wherein the transmitter is further configured to transmit, upon determining that there are not enough radio subframes for transmitting the system information in the first radio frame, a second part of the system information in at least a second radio frame in the system information window subsequent to the first radio frame in time domain.

6. The apparatus of claim 5, wherein the second radio frame is next to the first radio frame in time domain.

7. An apparatus for receiving system information, comprising:
   a receiver configured to receive a first part of a system information in a system information window from a base station, wherein the first part of the system information is carried in one or more radio subframes of a first radio frame in the system information window, the first radio frame indicated by a system information repetition pattern and the one or more radio subframes being valid for carrying a transmission from the base station to the apparatus, the system information repetition pattern specifying that the system information is transmitted in $M^{th}$ radio frame of every N radio frames, M being greater than or equal to 1 and less than or equal to N,
   wherein the receiver is further configured to receive, upon a determination that there are not enough radio subframes for the system information in the first radio frame, a second part of the system information in at least a second radio frame in the system information window subsequent to the first radio frame in time domain.

8. The apparatus of claim 7, wherein the second radio frame is next to the first radio frame in time domain.

9. A non-transitory computer readable storage medium comprising code stored thereon, the code when executed by a processor, causing the processor to implement a method that comprises:

transmitting, by the base station, a first part of a system information in a system information window to a terminal, wherein the first part of the system information is carried in one or more radio subframes of a first radio frame in the system information window, the first radio frame indicated by a system information repetition pattern and the one or more radio subframes being valid for carrying a transmission from the base station to the terminal, the system information repetition pattern specifying that the system information is transmitted in $M^{th}$ radio frame of every N radio frames, M being greater than or equal to 1 and less than or equal to N, transmitting, by the base station upon determining that there are not enough radio subframes for transmitting the system information in the first radio frame, a second part of the system information in at least a second radio frame in the system information window subsequent to the first radio frame in time domain.

10. The non-transitory computer readable storage medium of claim 9, wherein the second radio frame is next to the first radio frame in time domain.

11. A non-transitory computer readable storage medium comprising code stored thereon, the code, when executed by a processor, causing the processor to implement a method that comprises:

receiving, by a terminal, a first part of system information in a system information window from a base station, wherein the first part of the system information is carried in one or more radio subframes of a first radio frame in the system information window, the first radio frame indicated by a system information repetition pattern and the one or more radio subframes being valid for carrying a transmission from the base station to the terminal, the system information repetition pattern specifying that the system information is transmitted in $M^{th}$ radio frame of every N radio frames, M being greater than or equal to 1 and less than or equal to N, and receiving, by the terminal upon a determination that there are not enough radio subframes for the system information in the first radio frame, a second part of the system information in at least a second radio frame in the system information window subsequent to the first radio frame in time domain.

12. The non-transitory computer readable storage medium of claim 11, wherein the second radio frame is next to the first radio frame in time domain.

\* \* \* \* \*

UNITED STATES PATENT AND TRADEMARK OFFICE
CERTIFICATE OF CORRECTION

PATENT NO. : 10,979,929 B2
APPLICATION NO. : 16/189979
DATED : April 13, 2021
INVENTOR(S) : Ai et al.

Page 1 of 1

It is certified that error appears in the above-identified patent and that said Letters Patent is hereby corrected as shown below:

In the Claims

In Column 14, Line 32, in Claim 5, delete "than N," and insert -- than or equal to N, --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*